United States Patent
Shintani et al.

(10) Patent No.: US 9,800,819 B2
(45) Date of Patent: Oct. 24, 2017

(54) METHODOLOGIES AND APPARATUS FOR REDUCING DELAYS WHEN RECEIVING, PROCESSING, OR SWITCHING CONTENT

(71) Applicant: Sony Corporation, Tokyo (JP)

(72) Inventors: Peter Shintani, San Diego, CA (US); Robert Blanchard, Escondido, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/048,276

(22) Filed: Feb. 19, 2016

(65) Prior Publication Data

US 2017/0244924 A1    Aug. 24, 2017

(51) Int. Cl.
*H04N 5/50* (2006.01)
*H04N 5/46* (2006.01)

(52) U.S. Cl.
CPC ............. *H04N 5/50* (2013.01); *H04N 5/46* (2013.01)

(58) Field of Classification Search
USPC ...... 348/732, 705, 706, 714, 719, 721, 723, 348/724, 725, 726, 737, 608, 676, 563, 348/567, 569, 571, 432.1, 462, 467, 473, 348/385.1, 398.1, 295, 133, 42, 38, 14.09; 725/32, 38, 45, 54, 58, 81, 116; 345/644
See application file for complete search history.

(56) References Cited

U.S. PATENT DOCUMENTS

| | | | | |
|---|---|---|---|---|
| 7,516,472 | B2 * | 4/2009 | Danker | H04N 7/17318 348/180 |
| 8,132,204 | B2 * | 3/2012 | Haberman | G06F 17/30817 725/138 |
| 8,854,428 | B2 * | 10/2014 | Suh | H04N 13/0022 348/42 |
| 2001/0024444 | A1 * | 9/2001 | Asai | G06F 17/30905 370/401 |
| 2004/0205816 | A1 * | 10/2004 | Barrett | H04N 5/76 725/49 |
| 2004/0268250 | A1 * | 12/2004 | Danker | G06F 3/0236 715/210 |
| 2005/0022242 | A1 * | 1/2005 | Rosetti | H04N 5/782 725/58 |
| 2006/0236232 | A1 * | 10/2006 | Yuasa | H04N 7/163 715/203 |

(Continued)

OTHER PUBLICATIONS

International Search Report and Written Opinion issued Mar. 9, 2017 in PCT/US17/16918.

*Primary Examiner* — Jefferey F Harold
*Assistant Examiner* — Mustafizur Rahman
(74) *Attorney, Agent, or Firm* — Oblon, McClelland, Maier & Neustadt, L.L.P.

(57) ABSTRACT

Methods and apparatuses are provided for receiving content. The method includes receiving a first service, by a receiver of a reception apparatus, the first service providing first content and first metadata associated with the first content. The first content is encoded in one of a plurality of formats decodable by the reception apparatus. Further, the method includes generating, by circuitry of the reception apparatus, first codec mode information based on the first metadata received with the first content. The first codec mode information indicates the one of the plurality of formats or a codec for decoding the one of the plurality of formats. The generated first codec mode information in association with the first service is stored, by the circuitry, in a table. The table includes codec mode information for a plurality of different services, which includes the first service.

24 Claims, 9 Drawing Sheets

(56) References Cited

U.S. PATENT DOCUMENTS

| | | | | |
|---|---|---|---|---|
| 2007/0065107 A1* | 3/2007 | Ryu | .................... | G11B 27/034 |
| | | | | 386/201 |
| 2008/0002945 A1* | 1/2008 | Ushimaru | ............ | G11B 27/105 |
| | | | | 386/248 |
| 2008/0104658 A1* | 5/2008 | Lim | ..................... | H04N 5/76 |
| | | | | 725/142 |
| 2009/0027555 A1* | 1/2009 | Hanko | ................ | H04N 5/4401 |
| | | | | 348/569 |
| 2009/0276862 A1* | 11/2009 | Komori | .................. | G06F 21/10 |
| | | | | 726/30 |
| 2010/0058420 A1* | 3/2010 | Medina | ............. | H04N 21/2385 |
| | | | | 725/116 |
| 2010/0115346 A1* | 5/2010 | Lee | ..................... | H04L 67/32 |
| | | | | 714/49 |
| 2010/0189131 A1* | 7/2010 | Branam | ........... | H04N 21/23424 |
| | | | | 370/474 |
| 2010/0325655 A1* | 12/2010 | Perez | ..................... | G06Q 30/02 |
| | | | | 725/30 |
| 2012/0045985 A1* | 2/2012 | Choi | ................ | H04N 1/00347 |
| | | | | 455/3.06 |
| 2012/0069911 A1* | 3/2012 | Richardson | ............ | H04N 19/70 |
| | | | | 375/240.25 |
| 2012/0300017 A1* | 11/2012 | Li | ..................... | H04N 7/152 |
| | | | | 348/14.09 |
| 2014/0301356 A1* | 10/2014 | Wang | .................... | H04L 1/0003 |
| | | | | 370/330 |
| 2015/0296275 A1* | 10/2015 | MacLeod | ........... | H04N 21/8455 |
| | | | | 725/32 |
| 2015/0358683 A1* | 12/2015 | Perez | ..................... | G06Q 30/02 |
| | | | | 725/45 |

* cited by examiner

METHODOLOGIES AND APPARATUS FOR REDUCING DELAYS WHEN RECEIVING, PROCESSING, OR SWITCHING CONTENT

TECHNICAL FIELD

The present disclosure relates to methods and apparatuses for reducing delays when receiving, processing, or switching content.

BACKGROUND

When a television is initially installed in a user's home after purchase, the receiver of the TV may perform an initial scan for channels that are available in the area and record information pertaining to available channels in a memory using a data structure known as a "channel map". The channel map includes information for each available channel, such as channel frequency and a corresponding channel number. For example, channel two may be mapped to a first frequency range of a broadcast signal, channel four may be mapped to a second frequency range, and so on. If multiple services are multiplexed at the same frequency, a virtual channel map may be used to map frequency ranges and service identifiers to particular virtual channel numbers.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

According to an embodiment of the present disclosure, there is provided a method of a reception apparatus for receiving content. The method includes receiving a first service, by a receiver of the reception apparatus, the first service providing first content and first metadata associated with the first content. The first content is encoded in one of a plurality of formats decodable by the reception apparatus. Further, the method includes generating, by circuitry of the reception apparatus, first codec mode information based on the first metadata received with the first content. The first codec mode information indicates the one of the plurality of formats or a codec for decoding the one of the plurality of formats. The generated first codec mode information in association with the first service is stored, by the circuitry, in a table. The table includes codec mode information for a plurality of different services, which includes the first service.

According to an embodiment of the present disclosure, there is provided a non-transitory computer-readable medium storing instructions which, when executed by at least one processor, cause the at least one processor to perform the above-described method of a reception apparatus for receiving content.

According to an embodiment of the present disclosure, there is provided a reception apparatus. The reception apparatus comprises a receiver configured to receive a first service, the first service providing first content and first metadata associated with the first content, the first content being encoded in one of a plurality of formats decodable by the reception apparatus. Further, the reception apparatus comprises circuitry configured to generate first codec mode information based on the first metadata received with the first content. The first codec mode information indicates the one of the plurality of formats or a codec for decoding the one of the plurality of formats. Further, the circuitry stores the generated first codec mode information in association with the first service in a table. The circuitry is configured to store codec mode information for a plurality of different services, which includes the first service, in the table.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar, or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library, a dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The following description relates to methods and apparatuses for reducing delays that may result when processing a service, which provides content, such as a television broadcast or OTT (over-the-top) services. Different services may include different content (e.g., audio and/or video content) and/or versions of the same content. The services are provided by one or more service providers (e.g., a terrestrial, cable television, or satellite broadcaster; Internet radio, terrestrial, or satellite radio broadcaster; etc.). Further, a service may be provided via various communication means such as broadcast or broadband channels. Exemplary broadcast services are described in ATSC Candidate Standard: Service Announcement (A/332, Doc. S33-159r1, Nov. 24, 2015), which is incorporated herein by reference in its entirety. As described in the ATSC Candidate Standard A/332, exemplary services may include scheduled television services, data services, and/or on-demand services.

For example, in the future, audio/video content (e.g., television programming) may be encoded in different audio and/or video formats. In this case, metadata corresponding to the audio/video content may specify the type of audio and/or video processing required for a reception apparatus (e.g., a television) to process the content for presentation to a user. The metadata may be specific to the audio/video content or apply to a service that provides the audio/video content and other audio/video content (e.g., a television broadcast service that provides different programs over time). Because the execution of the processing requirements in the reception apparatus is not instantaneous, a delay may occur when processing or switching to the audio/video content. The metadata requirements may specify HDR (high dynamic range) or SDR (standard dynamic range) video processing or different audio codecs.

Transitioning to content encoded in a different format may cause delays while the reception apparatus configures itself to handle the new format. For example, for a reception apparatus that implements different audio and/or video codecs using a DSP (digital signal processor) with multiple versions of software, the DSP will need time to load the version of software needed to process any new audio and/or video formats when switching to, or otherwise processing, that content. In the case of different audio and/or video hardware codecs, a delay may occur when preforming routing to one or more appropriate hardware codecs.

To reduce the potential delay caused by transitioning to content encoded in different formats, services that provide the content are grouped (e.g., in a table such as a channel map) based upon the requirements specified in the metadata in certain embodiments, as further described below. For example, once a reception apparatus receives a communication signal (or data stream), a table representing a virtual map, service list table, or other data structure is utilized to map frequency ranges and/or service identifiers contained in the communication signal to particular channel numbers. For example, channel two may be mapped to a first frequency range, channel four may be mapped to a second frequency range, and so on. The table may be created when the reception apparatus is first brought into service, as services are first processed, or whenever the reception apparatus is moved to a new location. Additionally, the table may be updated whenever there is a change in the selection of available television channels or a change in encoding is otherwise detected.

In one embodiment, the reception apparatus relies on metadata to switch video and/or audio processing modes (e.g., codec modes). The reception apparatus supports a plurality of modes in order to process content encoded in different formats. When the reception apparatus relies on the metadata to determine the necessary processing modes, channel surfing can be delayed as a decoder has to receive the metadata (e.g., tune to a terrestrial broadcast channel containing the service and extract the metadata) and then reset codecs, or perform routing to one or more hardware codecs, according to the mode signaled in the metadata, before displaying the content. To reduce this delay, the processing modes for predetermined content, times/days, services, or service providers are stored in the reception apparatus for future reference. In certain embodiments, a table of a plurality of different services associated with their respective codec mode information (e.g., information that indicates one or more encoding formats of the content or one or more codecs for decoding the content) is generated, or a sequence of the different services is determined, based on the required processing modes to minimize mode switching. That is, as described further below, according to certain embodiments, when the organization (e.g., grouping, order) of channels included in the table is based on the encoding format information, delays when switching channels can be further reduced.

In general, a service provider encodes content according to one or more predetermined encoding formats (e.g., one or more of video and/or audio formats). For example, a first broadcaster may use Advanced Audio Coding (AAC), a second broadcaster may use Dolby® Digital (AC-3), and so on. The broadcaster usually does not change the encoding mode during programming or on a daily basis. Thus, once the encoding mode is determined after tuning, it is likely that the encoding mode remains unchanged for a period of time. For example, after determining by tuning that a first channel carrying a first service is using AAC then likely the first channel will continue to use AAC for all programs, for a period of time, or at least for the duration of a specific program. Thus, the encoding mode may be associated with a channel, a time/date, or a program.

As described above, a delay is caused when changing to a service (e.g., by changing channels) that provides content that is encoded in a different format. The reception apparatus tunes, demodulates, and parses a communication signal or data stream to determine which codecs are needed to decode the content, then the DSP needs to be reprogrammed based on the required codec(s). A new decoding algorithm is loaded to the DSP that is associated with the codec. For example, in the case of content that includes audio and video, the reception apparatus may be configured to decode a plurality of different audio formats, a plurality of different video formats, or different audio and video formats. Accordingly, in one embodiment, the reception apparatus only determines which codec to use based on whether it can decode a plurality of different formats. For example, when the reception apparatus has a single fixed video codec and a plurality of different audio codecs, the reception apparatus simply determines which audio codec is needed to decode the content. In one embodiment, when a user changes services (e.g., by changing a channel), the reception apparatus blanks the video, flushes, and empties everything in the pipeline until a new video stream is received. Then, once a picture is available, it is displayed. In certain embodiments, the determination of any necessary codecs and/or configuration of the reception apparatus to use any of the necessary codecs in performed before, or while, the new video stream is being received.

In one embodiment, the reception apparatus may support a plurality of broadcast standards (e.g., ATSC 1.0, ATSC 3.0). A physical frequency may be associated to a modulation type, a codec mode, and/or other information (e.g., antenna orientation data). Thus, the table stores one or a combination of the physical frequency, the modulation type, codec modes, and other information. For example, in ATSC 1.0, the modulation type may include 8VSB (8-level Vestigial Sideband Modulation) and the transmission transport stream based. In ATSC 3.0, the modulation type may include OFDM (Orthogonal frequency-division multiplexing) and the transmission IP (Internet Protocol) based. In addition, each segment of the payload may have a different FEC (Forward Error Encoding) level. For example, the payload may be split up between normal and robust segments. Thus, the table may also store the OFDM type associated with each physical frequency. In one example, audio codec modes may include Dolby® AC-3, Dolby® AC-4, MPEG-H (e.g., for 3D audio), and AAC. Video codec modes may include MPEG-2, H.264/MPEG-4 AVC (Advanced Video Coding), and HEVC (High Efficiency Video Coding).

Figure 1:
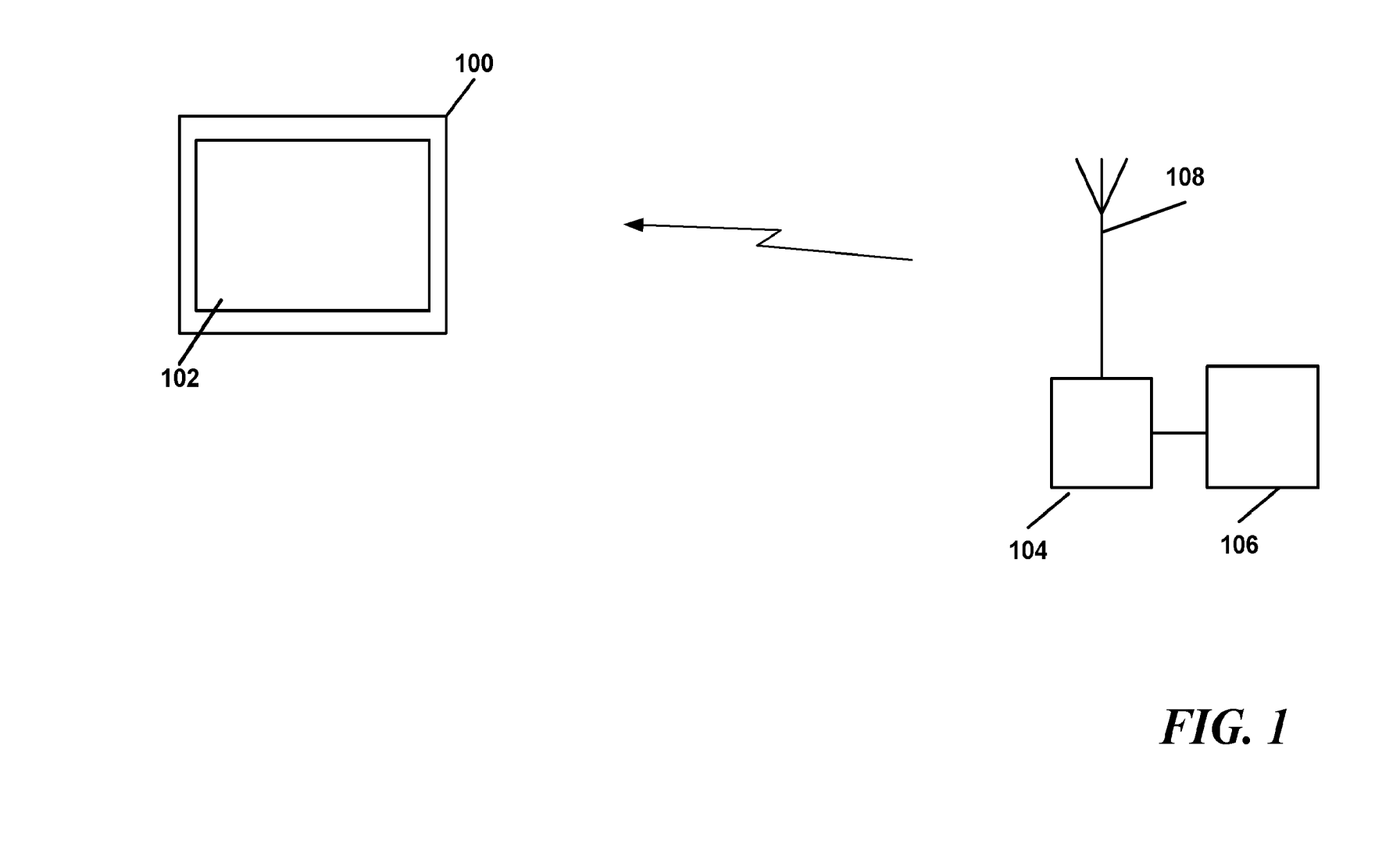
FIG. 1 is an exemplary system for broadcasting and receiving communication signals according to one example.

FIG. 1 is an exemplary system for broadcasting and receiving communication signals containing services that provide content according to one example. The communication signals may be digital television signals (e.g., terrestrial television broadcast signals) broadcast by different service providers, each broadcasting one or more different services. The system includes a reception apparatus 100, a transmitter 104, a core network 106, and an antenna 108. The core network 106 includes a signal source such as a television studio camera that captures video and audio data and converts the data into a signal, or equipment to read out or receive (e.g., from a server) pre-recorded content, which is transmitted to the transmitter 104. The transmitter 104 processes the signal received from the core network 106 to transform the signal into a form suitable for transmission as would be understood by one of ordinary skill in the art.

The communication signals include services that provide audio/video streams. In one embodiment, an audio/video stream includes digital radio music channels that transmit an audio stream and may include an associated video image such as album cover art, song title, track information, artist information, and publisher information. The audio/video streams are assembled and encoded using encoders.

The signal carrying the data (or stream) may be transmitted to the reception apparatus 100 over a terrestrial broadcast, a cable connection, or a satellite link. The system may use any one or a variety of transmission techniques to communicate data to the reception apparatus 100, for example the system may use a single or a multicarrier technique as would be understood by one of ordinary skill in the art. The transmitter 104 may include one or more data, audio, and videos encoders to compress the audio, video, and/or other data. The transmitter 104 may also include a channel encoder that randomizes, interleaves, channel codes, and frame maps the compressed signaling data.

In one embodiment, the reception apparatus 100 shown in FIG. 1 includes a TV receiver. However, it is to be understood that the reception apparatus 100 may be configured to receive terrestrial radio, internet radio, or the like. The reception apparatus 100 may also include a display 102 (e.g., a liquid crystal display or organic light-emitting diode display), such as a television.

The reception apparatus 100 is configured to receive the communication signal. For example, the reception apparatus 100 receives the communication signal from an antenna receiving terrestrially broadcast over-the-air signals, a satellite dish receiving a television signal transmitted via satellite, a cable television provider, and the like. In another example, the reception apparatus 100 receives a data stream via a network interface such as in the case of OTT services. In one embodiment, the reception apparatus 100 includes one or more RF tuners that receives off-air analog (e.g., 54 and 864 MHz, or the like), off-air digital (e.g., Advanced Television system committee (ATSC) digital television (DTV), or the like), cable analog (e.g., National television system committee (NTSC), or the like), and/or cable digital (e.g., 64 QAM/256 QAM, or the like) signals. The tuner in the reception apparatus 100 may be a single simple tuner that receives one signal type, a single flexible tuner that receives multiple signal types, two or more simple tuners where each tuner receives a different signal type, or two or more flexible tuners where each tuner is able to receive multiple signal types.

Figure 7:
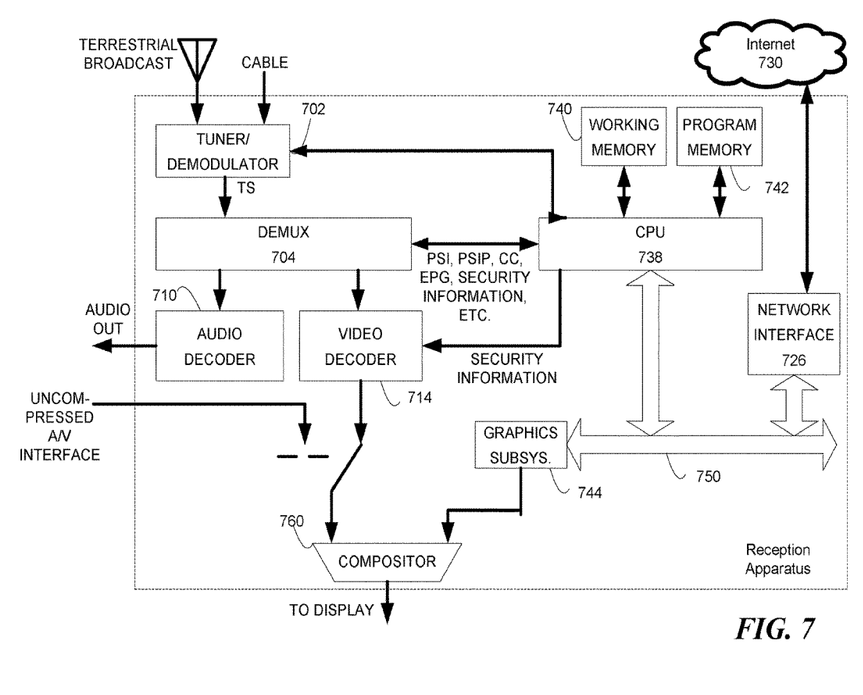
FIG. 7 illustrates an exemplary reception apparatus.

In an embodiment, the reception apparatus 100 may include one or a combination of a decoder such as an HEVC decoder, a H.264/MPEG-4 AVC decoder, MPEG-2 decoder or the like. The decoder may be implemented by circuitry or software, which is executed by a DSP for example. An exemplary reception apparatus is shown in FIG. 7. For example, when the reception apparatus 100 supports both ATSC 1.0 and a next generation ATSC broadcast services, the reception apparatus 1 may be configured to support MPEG-2, AC-3, and 8-VSB modulation for ATSC 1.0, and HEVC/AVC, AC-4/MPEG-H, and/or OFDM modulation for the next generation service.

In certain embodiments, the service provider sends a static metadata file with the service, or content, to facilitate content processing. However, the metadata may be provided in other formats, including in EPG (electronic program guide) data or may be otherwise acquired over the Internet. Metadata for audio may be signaled in a signaling layer or audio data headers. Audio may have a baseline and downloadable codec. Video may have HDR (High Dynamic Range) metadata signaled in a signaling layer or video data headers. HDR has ten times more brightness than SDR (Standard dynamic range). Thus, the mode must be switched to use HDR instead of SDR.

In one embodiment, the metadata signals the type of HDR used and the nonlinear curve used to map the dynamic range. The nonlinear curves may include PQ (Perceptual Quantizer) by Dolby, Philips curve (ST-2094-20), or the like. The metadata also includes an average picture brightness, minimum and maximum pixel brightness, and curve identifier.

For example, PQ is a 12-bit curve fit to the Barten observation, designed to operate from 0 to 10,000 nits. PQ is a logarithmic-like curve that replaces gamma in image encoding by Dolby.

In the case of HDR content, the HDR portion of the content may be layered on top of the SDR data as an extra package and signaled to the reception apparatus 100 with metadata. If the reception apparatus 100 does not support HDR, the reception apparatus 100 simply ignores the extra package.

THX Ltd.® has vendor specific data that may help DTS (Digital Theater Systems) decoders to better process sound for example, theatrical, documentary, and the like, and is signaled in the metadata in one embodiment.

The table may be updated during auto programming, generated over time, or sequentially. Further, the table may be updated either periodically or upon the identification of a predetermined event. For example, upon the receipt of a user request or upon receiving information from a service provider indicating a change in one or more codec modes. The table may also, or alternatively, be updated according to an EPG schedule. The table may be included in the EPG in one embodiment.

Figure 2:
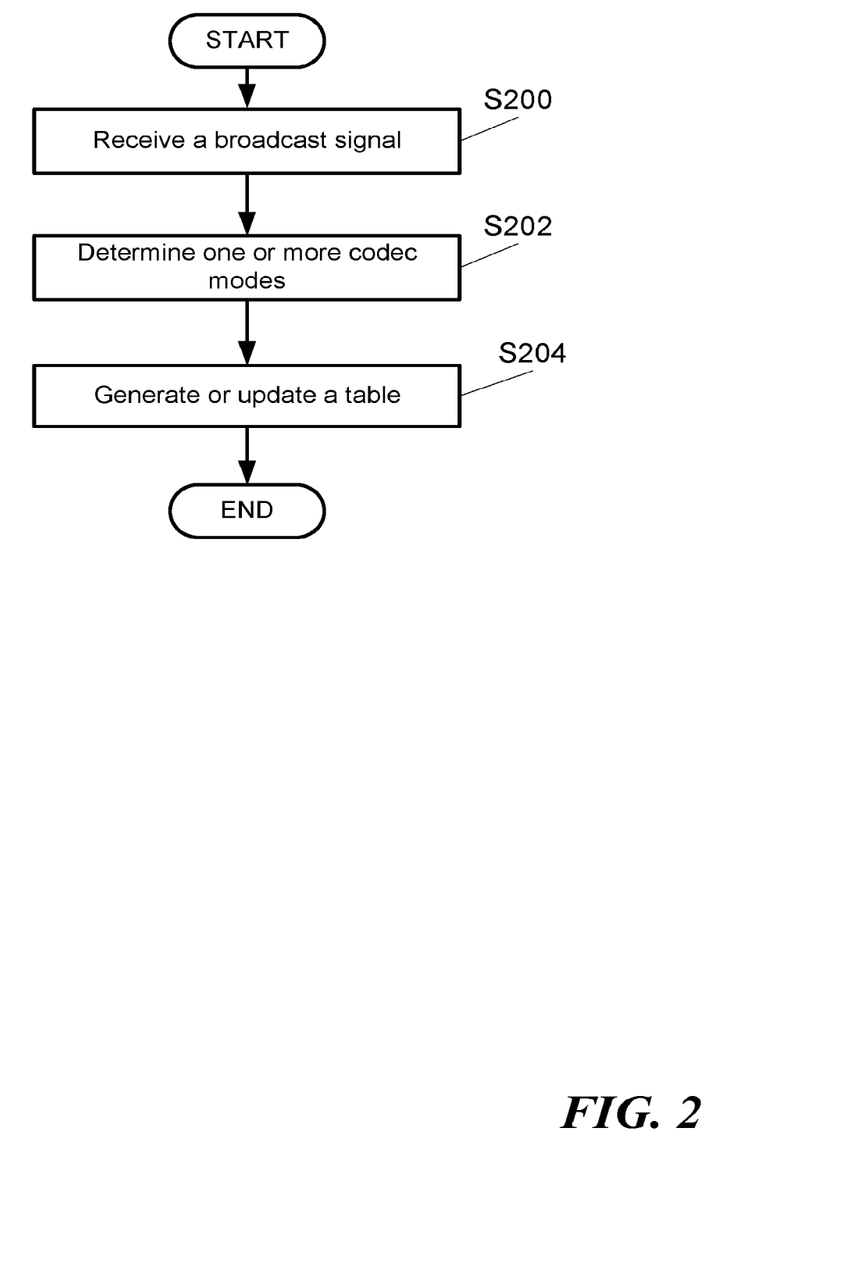
FIG. 2 is a flow chart that shows an operation of a reception apparatus for storing codec mode information according to one example.

FIG. 2 is a flow chart that shows an operation of the reception apparatus 100 for storing codec mode information according to one example. At step S200, the reception apparatus 100 begins receiving a selected service, for example by tuning to a channel to receive a broadcast signal (or data stream) carrying the service. For example, the reception apparatus 100 tunes to the channel in response to a user channel selection or during an initial channel scan. At step S202, the reception apparatus 100 determines one or more codec modes for processing the content provided by the service on that channel. The one or more codec modes may be signaled in metadata received with the service (e.g., in the broadcast signal). For example, the metadata may identify the one or more encoding formats (e.g., audio and/or video encoding formats) used to encode the content and/or one or more codecs for decoding the one or more encoding formats. In one example, the audio codec mode may include any one or a combination of AC-3, AC-4, MPEG-H, and AAC. The video codec mode may include MPEG-2, AVC, and HEVC.

At step S204, a table is generated or updated based on the one or more codec modes determined in step S202. The table stores an indication of the one or more codec modes (e.g., codec mode information) in association with the service for future reference. The table may be stored in any format. For example, the table may contain tables within tables or pointers to other tables, and it may have a linked list or tree structure. For example, the table may be linked to the broadcasting programs available for each service or channel and their associated one or more codec modes. Thus, the reception apparatus 100 is able to reduce a delay in switching to content provided by a service or channel in the future by beginning to configure itself to process that service's or channel's content as soon as the service or channel is selected, without the need to extract and processing metadata for that service or channel. Further, in certain embodiments, the table is organized based on the codec mode information. For example, services or channels that use the same codec mode(s) are grouped together, as further described below.

Figure 3:
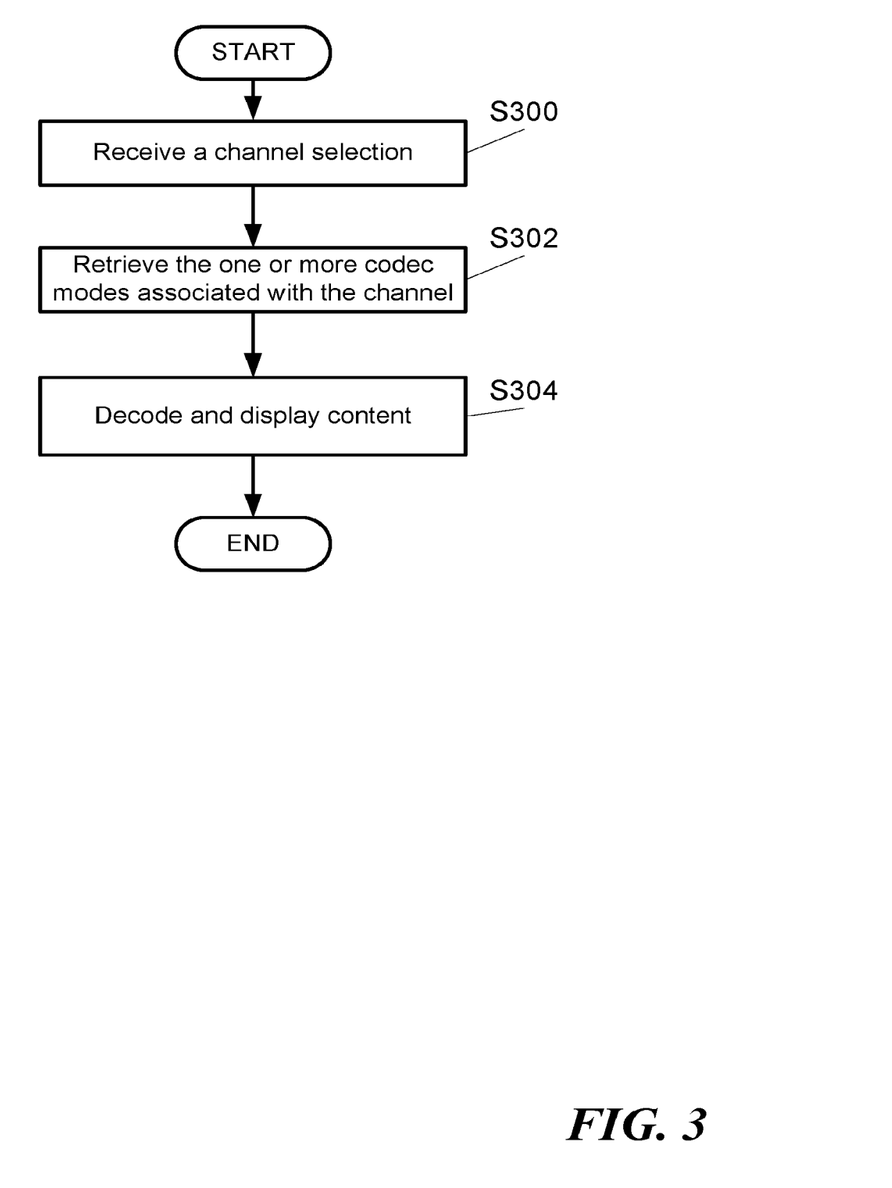
FIG. 3 is a flow chart that shows an operation of the reception apparatus for processing content according to one example.

FIG. 3 is a flow chart that shows an operation of the reception apparatus 100 for processing content according to one example. At step S300, the reception apparatus 100 receives a service or channel selection from the user. For example, the user may input a channel number, which is associated with the service, using a remote control or using the channel up or channel down buttons of the remote control to select a channel. The remote control sends control signals to the reception apparatus 100 indicating the channel selection of the user. At step S302, the reception apparatus 100 tunes to the channel selected at step S300 to receive a broadcast signal (or data stream). The reception apparatus 100 identifies the one or more codec modes associated with the channel. For example, the reception apparatus 100 may use the table stored in the reception apparatus 100 to identify the one or more codec modes. As described previously herein, an indication of the one or more codec modes associated with each channel and/or service is stored in the table according to the methodology shown in FIG. 2. Further, in response to determining that an indication of the one or more codec modes associated with the channel is not stored in the table, the reception apparatus 100 may extract, or otherwise determine, the one or more codec modes from the metadata. In one embodiment, even when the indication of the one or more codec modes is stored, the reception apparatus 100 processes the metadata to confirm whether the stored information is accurate either during or before the reception apparatus 100 configures itself based on the previously indicated one or more codec modes. At step S304, the reception apparatus 100 processes the content for presentation to the user. For example, the reception apparatus loads one or more codecs, or performs routing, according to the one or more codec modes identified at step S302 to decode the broadcast signal. Then, the content is displayed to the user.

The table may be updated periodically and/or when a signal indicating that there is a change in codec modes is received. For example, a broadcaster may indicate to the reception apparatus 100 a schedule for updating codec modes. Thus, the reception apparatus 100 may tune to the channel at the predetermined time indicated in the schedule, determine the updated one or more codec modes, and update the table.

In certain embodiments, the table is organized based on the codec mode information. For example, services or channels that use the same codec mode(s) are grouped together. Thus, when a user is surfing channels (e.g., by issuing channel up and/or down commands), the reloading of different audio and/or video codecs is minimized and therefore reducing the delay when switching content.

Figure 4:
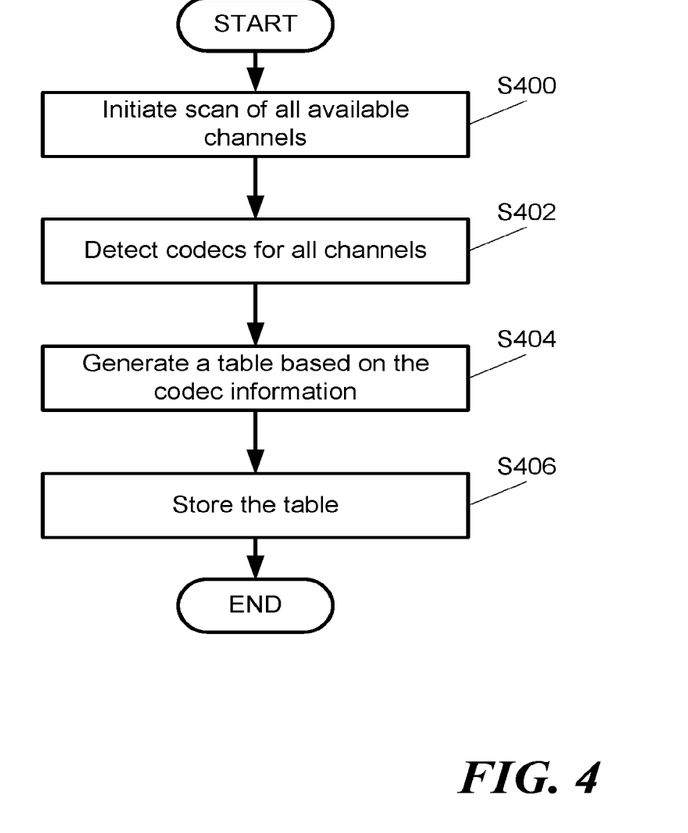
FIG. 4 is a flow chart that shows an operation of the reception apparatus for generating a table according to one example.
Figure 5:
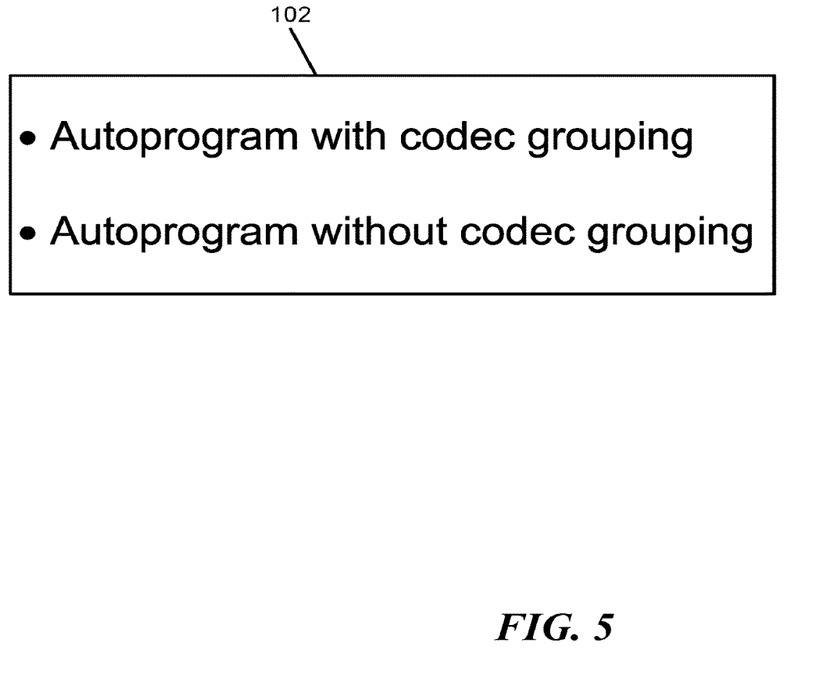
FIG. 5 is an exemplary graphical user interface according to one example.

FIG. 4 is a flow chart that shows an operation of the reception apparatus 100 for generating a table according to one example. At step S400, the reception apparatus 100 initiates a scan for all available channels (e.g., all receivable television or radio broadcast channels). The reception apparatus 100 may initiate the scan based on a user input (e.g., the initiation of an auto program function of the reception apparatus 100). The user input may be received using a graphical user interface. An exemplary graphical user interface is shown in FIG. 5. At step S402, the reception apparatus 100 determines the one or more codec modes for processing the content provided by services on the plurality of channels. As described above, the one or more codec modes may be signaled in the metadata received with each broadcast signal. The codec mode may be signaled by identifying the encoding format or codec needed for proper decoding. At step S404, the table is generated based on the codec mode information determined for the available channels. The table, in one embodiment, is further organized based on the codec mode information. For example, channels that use the same codec mode are grouped together. At step S406, the reception apparatus 100 stores the generated table, or reorganized table, in the memory.

FIG. 5 is an exemplary graphical user interface (GUI) according to one example that can be used to allow the user to initiate autoprogramming. The GUI may be presented on the display 102 in response to selecting "autoprogram" from a higher level menu. The GUI may include a "Autoprogram with codec grouping" selection, which if selected causes the processing circuitry of the reception apparatus 100 to execute the method shown and described in FIG. 4. In another embodiment, channel grouping function is performed separately from the autoprogramming and channel scan. For example, surfing of channels using the channel grouping function may be turned on and off by the user.

Figure 6:
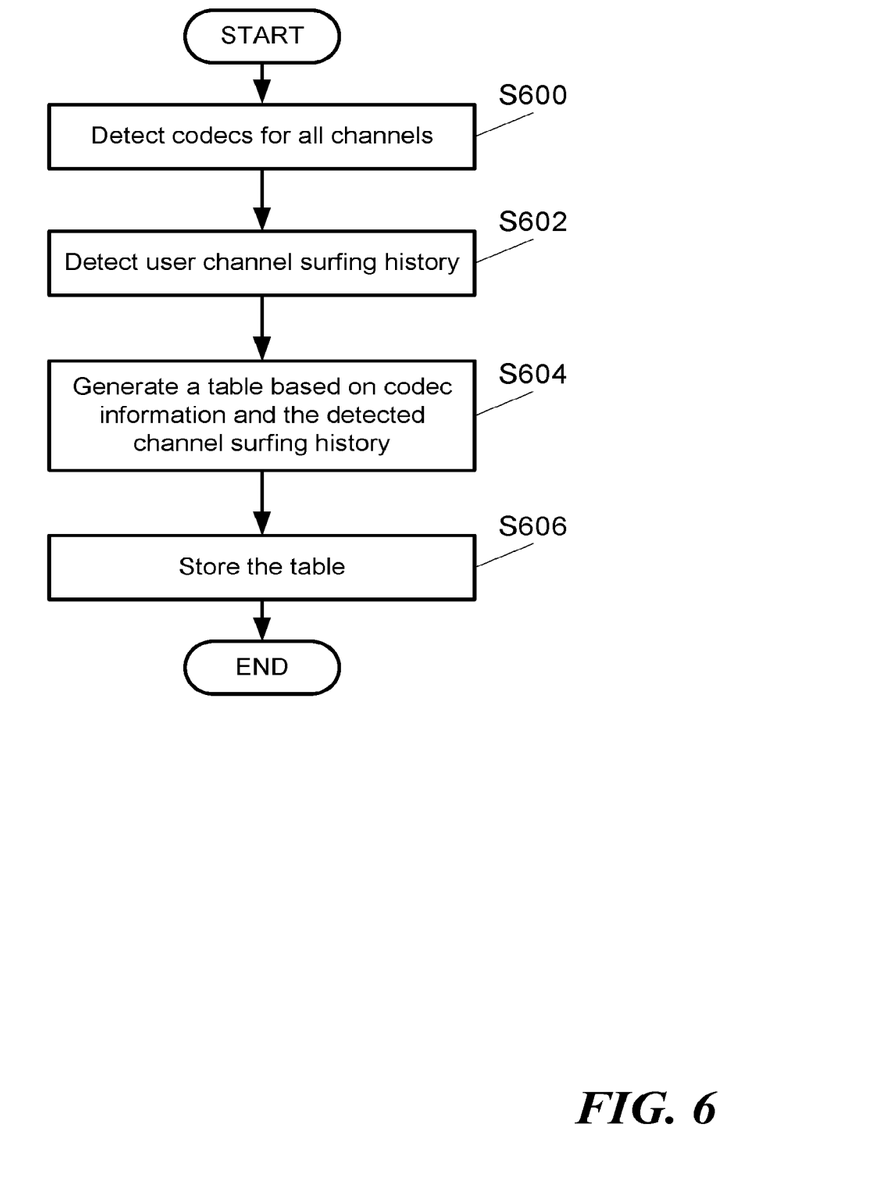
FIG. 6 is a flow chart that shows an operation of generating a table in the reception apparatus according to one example.

FIG. 6 is a flow chart that shows an operation of generating a table in the reception apparatus 100 according to one example. At step S600, the reception apparatus 100 may initiate a scan of all available channels. The reception apparatus 100 may initiate the scan based on a user input. The user input may be received using a graphical user interface, such as the graphical user interface shown in FIG. 5. The scan may be also initiated periodically, and for example during periods when the reception apparatus 100 is not in use. Then, the reception apparatus 100 determines the one or more codec modes for processing the content provided the services on the plurality of channels. The one or more codec modes may be signaled in the metadata received with each broadcast signal. At step S602, the reception apparatus 100 may detect and analyze a user channel surfing history. The reception apparatus may use forecasting techniques such as artificial intelligence methods (e.g., artificial neural networks) to analyze the user channel surfing history to determine future surfing behavior as would be understood by one of ordinary skill in the art. At step S604, the table is generated based on the codec mode information and the user channel surfing history. Further, in one embodiment, the table is organized based on the codec mode information and on the likelihood of surfing certain channels. For example, the groups of channels or the channels within a group may be ordered based on their frequency of access. At step S606, the reception apparatus 100 stores the generated table in the memory. The operation described in FIGS. 2-4 and 6 use broadcast signals as an example, but the services may be provided by other communication signals (e.g., mobile network signals) or over the internet in other embodiments.

Although FIGS. 4 and 6 describe generation of tables that are organized based on the codec information and/or channel surfing history, the table itself need not be reordered in other embodiments. For example, in one embodiment, the table may order the services (e.g., by virtual channel numbers sequentially) and a separate ordering may be generated using the codec mode information and/or the user channel surfing history. Further, although embodiments of the present disclosure (e.g., as described with respect to FIGS. 2-4 and 6) use a table that indicates codec mode information as an example, the present disclosure is not limited to storing one or a combination of video and audio codec mode information in the table. For example, the table may further, or alternatively, indicate other information such as modulation type (e.g., 8-VSB, OFDM, OFDM type, etc.) and antenna orientation data (e.g., if a rotor or electrically steerable antenna is used). This other information may be signaled in the same or different metadata indicating the codec mode information or may be determined by the reception apparatus 100 using other methods (e.g., trial and error).

FIG. 7 illustrates one embodiment of the reception apparatus 100, which is configured to implement one or a combination of the processes illustrated in FIGS. 2-4 and 6 in certain embodiments. The reception apparatus 100 includes a digital television receiver device that is incorporated into a fixed or mobile device such as a television set, a set top box, smartphone, tablet computer, laptop, portable computer, or any other device configured to receive television content. The reception apparatus 100 may also be incorporated in a vehicle.

The reception apparatus 100 includes a tuner/demodulator 702, which receives communication signals (e.g., digital television broadcast signals) or data streams from one or more service providers (e.g., transmitted by the transmitter 104) via, for example, a terrestrial broadcast. Depending on the embodiment, the reception apparatus 100 may alternatively or additionally be configured to receive a cable television transmission or a satellite broadcast. The tuner/demodulator 702 receives a signal, including for example an MPEG-2 TS or IP packets, which may be demultiplexed by the demultiplexer 704 or handled by middleware and separated into audio and video (A/V) streams. The audio is decoded by an audio decoder 710 and the video is decoded by a video decoder 714. Further, uncompressed A/V data may be received via an uncompressed A/V interface (e.g., a HDMI interface), if available.

In one embodiment, the received communication signal or data stream includes supplemental data such as one or a combination of closed caption data, a triggered declarative object (TDO), a trigger, a virtual channel table, EPG data, NRT content, metadata identifying one or more codec modes, etc. Examples of the TDO and trigger are described in ATSC Candidate Standard: Interactive Services Standard (A/105:2015), S13-2-389r8, which is incorporated herein by reference in its entirety. The supplemental data are separated out by the demultiplexer 704. However, the A/V content and/or the supplemental data may be received via the Internet 730 and a network interface 726.

A storage memory may be provided to store non real time content (NRT) or Internet-delivered content such as Internet Protocol Television (IPTV). The stored content can be played by demultiplexing the content stored in the storage unit by the demultiplexer 704 in a manner similar to that of other sources of content. Alternatively, the stored content may be processed and presented to the user by the CPU 738. The storage memory may also store any other supplemental data acquired by the reception apparatus. The storage memory may also store the table, including the metadata or codec mode information.

The reception apparatus 100 generally operates under control of at least one processor, such as the CPU 738, which is coupled to a working memory 740, program memory 742, and a graphics subsystem 744 via one or more buses (e.g., bus 750). The CPU 738 receives closed caption data from the demultiplexer 704 as well as any other supplemental data used for rendering graphics, and passes appropriate instructions and data to the graphics subsystem 744. The graphics outputted by the graphics subsystem 744 are combined with video images by the compositor and video interface 760 to produce an output suitable for display on a video display.

Further, the CPU 738 operates to carry out functions of the reception apparatus 100 including the processing of NRT content, triggers, TDOs, EPG data, metadata identifying the one or more codec modes, etc. For example, the CPU 738 operates to execute script objects (control objects) contained in the TDO, its trigger(s), etc., using for example a Declarative Object (DO) Engine stored in the program memory 742.

The CPU 738 processes the metadata accompanying the received communication signal or data stream to determine codec mode information for the content or service contained therein. As described above, the determined codec mode information is stored in the reception apparatus 100, for example in the storage memory, to reduce switching delays For example, when a new channel or service is selected, the CPU 738 retrieves the associated codec mode information from the storage memory and loads software codecs and/or performs routing for hardware codecs based on the retrieved codec mode information.

Although not illustrated in FIG. 7, the CPU 738 may be coupled to any one or a combination of the reception apparatus resources to centralize control of one or more functions. In one embodiment, the CPU 738 also operates to oversee control of the reception apparatus 100 including the tuner/demodulator 702 and other television resources. For example, FIG. 8 shows one implementation of CPU 738.

Figure 8:
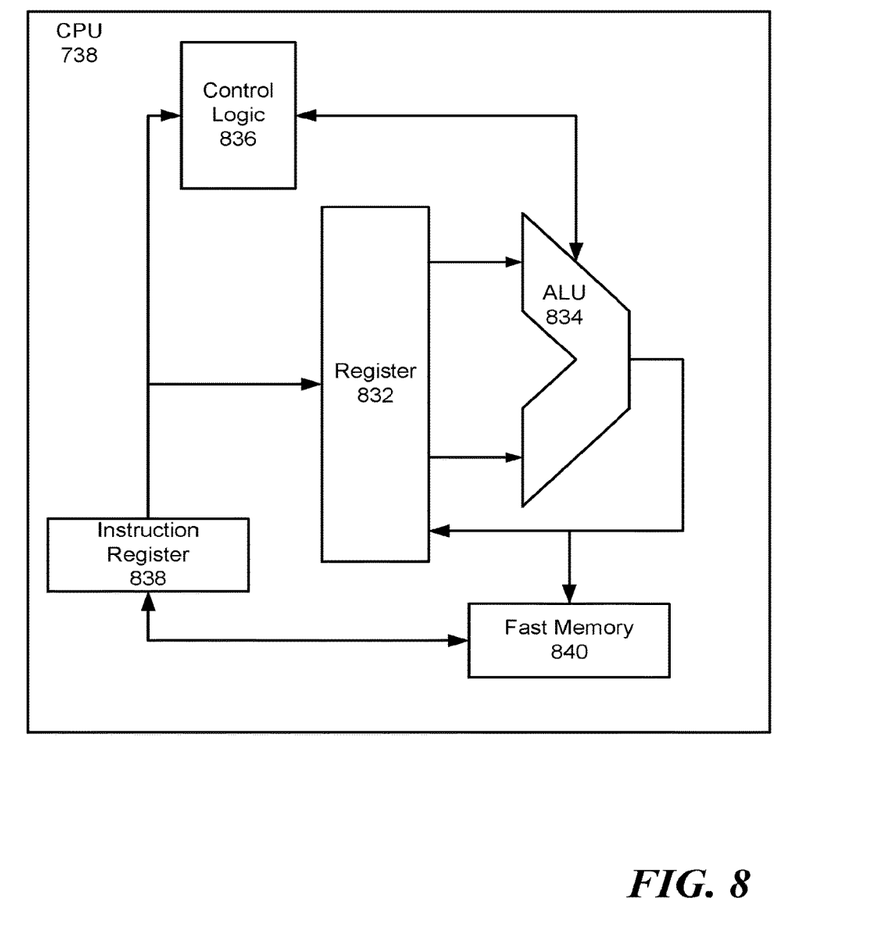
FIG. 8 is an exemplary block diagram of a central processing unit according to one example.

FIG. 8 illustrates one implementation of CPU 738, in which the instruction register 838 retrieves instructions from the fast memory 840. At least part of these instructions are fetched from the instruction register 838 by the control logic 836 and interpreted according to the instruction set architecture of the CPU 738. Part of the instructions can also be directed to the register 832. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 738 can use a reduced instruction set architecture, a complex instruction set architecture, a vector processor architecture, a very large instruction word architecture. Furthermore, the CPU 738 can be based on the Von Neuman model or the Harvard model. The CPU 738 can be a digital signal processor, an FPGA, an ASIC, a PLA, a PLD, or a CPLD. Further, the CPU 738 can be an x86 processor by Intel or by AMID; an ARM processor, a Power architecture processor by, e.g., IBM; a SPARC architecture processor by Sun Microsystems or by Oracle; or other known CPU architecture.

Figure 9:
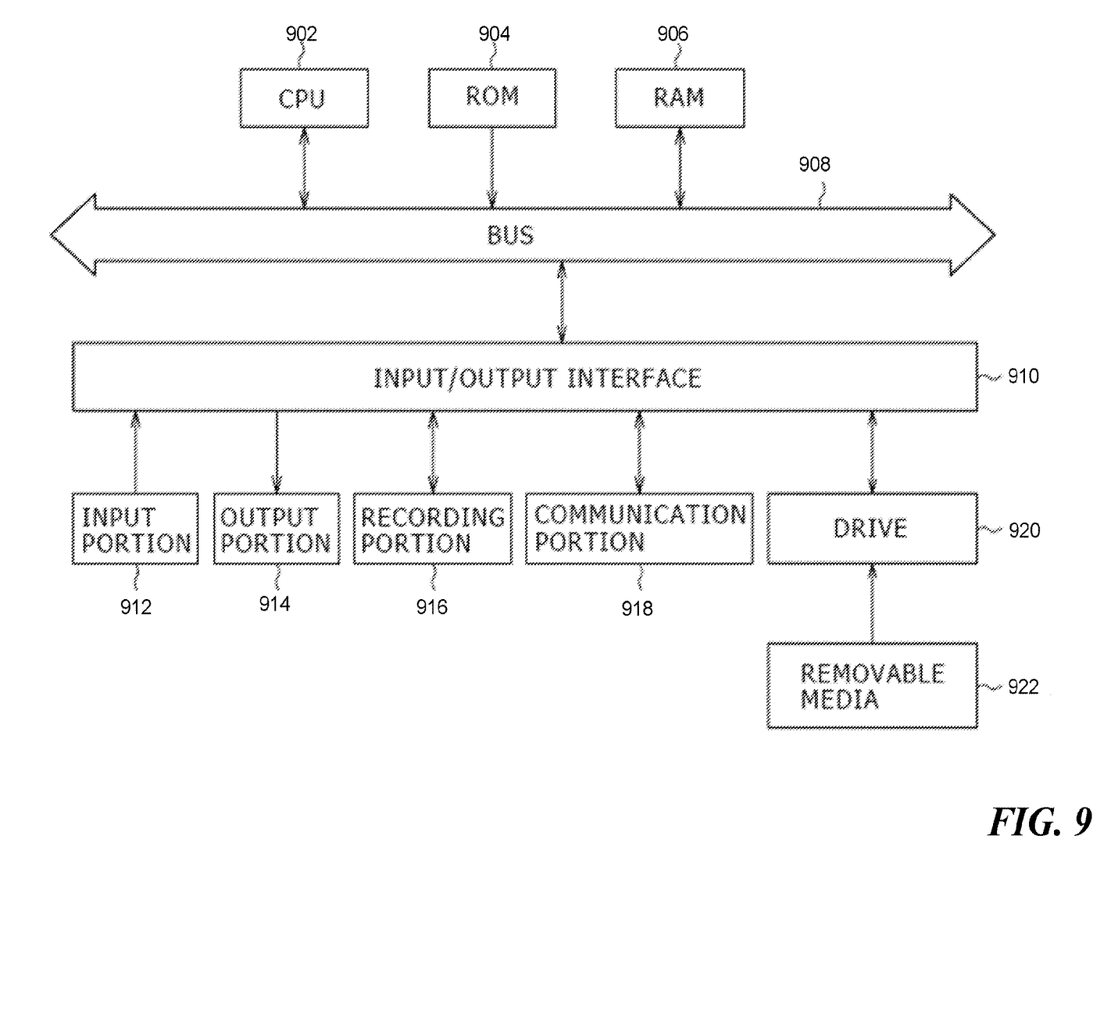
FIG. 9 is a block diagram showing an example of a hardware configuration of a computer.

FIG. 9 is a block diagram showing an example of a hardware configuration of a computer that can be configured to perform functions of any one or a combination of reception apparatus and transmission apparatus. For example, in one embodiment, the computer is configured to perform the functions in the digital domain such as the transmitter 104, or the reception apparatus 100 illustrated in FIG. 7.

As illustrated in FIG. 9 the computer includes a central processing unit (CPU) 902, read only memory (ROM) 904, and a random access memory (RAM) 906 interconnected to each other via one or more buses 908. The one or more buses 908 are further connected with an input-output interface 910. The input-output interface 910 is connected with an input portion 912 formed by a keyboard, a mouse, a microphone, remote controller, etc. The input-output interface 910 is also connected an output portion 914 formed by an audio interface, video interface, display, speaker and the like; a recording portion 916 formed by a hard disk, a non-volatile memory or other non-transitory computer readable storage medium; a communication portion 918 formed by a network interface, modem, USB interface, fire wire interface, etc.; and a drive 920 for driving removable media 922 such as a magnetic disk, an optical disk, a magneto-optical disk, a semiconductor memory, etc.

According to one embodiment, the CPU 902 loads a program stored in the recording portion 916 into the RAM 906 via the input-output interface 910 and the bus 908, and then executes a program configured to provide the functionality of the one or combination of the transmitter 104 and the reception apparatus 100.

The hardware description above, exemplified by any one of the structure examples shown in FIGS. 7 and 9, constitutes or includes specialized corresponding structure that is programmed or configured to perform the algorithms shown in FIGS. 2-4 and 6. For example, the algorithm shown in FIG. 2 may be completely performed by the circuitry included in the single device shown in FIG. 7 and/or FIG. 9.

Obviously, numerous modifications and variations are possible in light of the above teachings. It is therefore to be understood that within the scope of the appended claims, the embodiments of the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments noted below.

(1) A method of a reception apparatus for receiving content, the method including receiving a first service, by a receiver of the reception apparatus, the first service providing first content and first metadata associated with the first content, the first content being encoded in one of a plurality of formats decodable by the reception apparatus; generating, by circuitry of the reception apparatus, first codec mode information based on the first metadata received with the first content, the first codec mode information indicating the one of the plurality of formats or a codec for decoding the one of the plurality of formats; and storing, by the circuitry, the generated first codec mode information in association with the first service in a table, in which the table includes codec mode information for a plurality of different services, which includes the first service.

(2) The method of feature (1), in which the table includes channel numbers corresponding to each of the plurality of different services.

(3) The method of feature (2), further including receiving a selection of a second service of the plurality of different services from a user; retrieving second codec mode information associated with the second service from the table in response to the received selection; and decoding second content provided by the second service based on the retrieved second codec mode information.

(4) The method of feature (3), further including extracting second metadata received with the second content; and determining whether the retrieved second codec mode information is valid based on the extracted second metadata.

(5) The method of any one of features (1) to (4), further including receiving a command to switch to a next service in a predetermined sequence of the plurality of different services while the first service is being received; and switching to the next service in the predetermined sequence and decoding third content provided by the next service in response to the received command, in which the predetermined sequence is generated by grouping each of the plurality of different services in the table according to codec mode information associated with the respective service, and the third content is encoded in the one of the plurality of formats.

(6) The method of feature (5), further including identifying a channel surfing pattern; and generating the predetermined sequence based on the codec mode information for each of the plurality of different services and the identified channel surfing pattern.

(7) The method of any one of features (1) to (6), in which the first service is modulated based on a first modulation type and a second service of the plurality of difference services is modulated based on a second modulation type, and the table includes first modulation type information indicating the first modulation type associated with the first service and second modulation type information indicating the second modulation type associated with the second service.

(8) The method of feature (7), in which the first modulation type is 8-level vestigial sideband modulation, and the second modulation type is orthogonal frequency-division multiplexing.

(9) A reception apparatus, including a receiver configured to receive a first service, the first service providing first content and first metadata associated with the first content, the first content being encoded in one of a plurality of formats decodable by the reception apparatus; circuitry configured to generate first codec mode information based on the first metadata received with the first content, the first codec mode information indicating the one of the plurality of formats or a codec for decoding the one of the plurality of formats; and store the generated first codec mode information in association with the first service in a table, in which the circuitry is configured to store codec mode information for a plurality of different services, which includes the first service, in the table.

(10) The reception apparatus of feature (9), in which the table includes channel numbers corresponding to each of the plurality of different services.

(11) The reception apparatus of feature (10), in which the circuitry is configured to receive a selection of a second service of the plurality of different services from a user; retrieve second codec mode information associated with the second service from the table in response to the received selection; and decode second content provided by the second service based on the retrieved second codec mode information.

(12) The reception apparatus of feature (11), in which the circuitry is configured to extract second metadata received with the second content; and determine whether the retrieved second codec mode information is valid based on the extracted second metadata.

(13) The reception apparatus of any one of features (9) to (12), in which the circuitry is configured to receive a command to switch to a next service in a predetermined sequence of the plurality of different services while the first service is being received; and switch to the next service in the predetermined sequence and decode third content provided by the next service in response to the received command, in which the predetermined sequence is generated by grouping each of the plurality of different services in the table according to codec mode information associated with the respective service, and the third content is encoded in the one of the plurality of formats.

(14) The reception apparatus of feature (13), in which the circuitry is configured to identify a channel surfing pattern; and generate the predetermined sequence based on the codec mode information for each of the plurality of different services and the identified channel surfing pattern.

(15) The reception apparatus of any one of features (9) to (14), in which the first service is modulated based on a first modulation type and a second service of the plurality of difference services is modulated based on a second modulation type, and the table includes first modulation type information indicating the first modulation type associated with the first service and second modulation type information indicating the second modulation type associated with the second service.

(16) The reception apparatus of feature (15), in which the first modulation type is 8-level vestigial sideband modulation, and the second modulation type is orthogonal frequency-division multiplexing.

(17) A non-transitory computer readable medium storing computer-readable instructions therein which when executed by a computer cause the computer to perform a method for receiving content, the method including receiving a first service, the first service providing first content and first metadata associated with the first content, the first content being encoded in one of a plurality of formats decodable by the computer; generating first codec mode information based on the first metadata received with the first content, the first codec mode information indicating the one of the plurality of formats or a codec for decoding the one of the plurality of formats; and storing the generated first codec mode information in association with the first service in a table, in which the table includes codec mode information for a plurality of different services, which includes the first service.

(18) The non-transitory computer-readable medium of feature (17), in which the table includes channel numbers corresponding to each of the plurality of different services.

(19) The non-transitory computer-readable medium of feature (18), further including receiving a selection of a second service of the plurality of different services from a user; retrieving second codec mode information associated with the second service from the table in response to the received selection; and decoding second content provided by the second service based on the retrieved second codec mode information.

(20) The non-transitory computer-readable medium of feature (19), further including extracting second metadata received with the second content; and determining whether the retrieved second codec mode information is valid based on the extracted second metadata.

(21) The non-transitory computer-readable medium of any one of features (17) to (20), further including receiving a command to switch to a next service in a predetermined sequence of the plurality of different services while the first service is being received; and switching to the next service in the predetermined sequence and decoding third content provided by the next service in response to the received command, in which the predetermined sequence is generated by grouping each of the plurality of different services in the table according to codec mode information associated with the respective service, and the third content is encoded in the one of the plurality of formats.

(22) The non-transitory computer-readable medium of feature (21), further including identifying a channel surfing pattern; and generating the predetermined sequence based on the codec mode information for each of the plurality of different services and the identified channel surfing pattern.

(23) The non-transitory computer-readable medium of any one of features (17) to (22), in which the first service is modulated based on a first modulation type and a second service of the plurality of difference services is modulated based on a second modulation type, and the table includes first modulation type information indicating the first modulation type associated with the first service and second modulation type information indicating the second modulation type associated with the second service.

(24) The non-transitory computer-readable medium of feature (23), in which the first modulation type is 8-level vestigial sideband modulation, and the second modulation type is orthogonal frequency-division multiplexing.

The invention claimed is:

1. A method of a reception apparatus for receiving content, the method comprising:
   receiving a first service, by a receiver of the reception apparatus, the first service providing first content and first metadata associated with the first content, the first content being encoded in one of a plurality of formats decodable by the reception apparatus;
   generating, by circuitry of the reception apparatus, first codec mode information based on the first metadata received with the first content, the first codec mode information indicating the one of the plurality of formats or a codec for decoding the one of the plurality of formats;
   storing, by the circuitry, the generated first codec mode information in association with the first service in a table, wherein the table includes codec mode information for a plurality of different services, which includes the first service; and
   loading a codec for decoding the first content provided by the first service based on the first codec information, retrieved from the table, for the first service when the first service is subsequently selected for display to a user.

2. The method of claim 1, wherein the table includes channel numbers corresponding to each of the plurality of different services.

3. The method of claim 2, further comprising:
   receiving a selection of a second service of the plurality of different services from a user;
   retrieving second codec mode information associated with the second service from the table in response to the received selection; and
   decoding second content provided by the second service based on the retrieved second codec mode information.

4. The method of claim 3, further comprising:
   extracting second metadata received with the second content; and
   determining whether the retrieved second codec mode information is valid based on the extracted second metadata.

5. The method of claim 1, further comprising:
   receiving a command to switch to a next service in a predetermined sequence of the plurality of different services while the first service is being received; and
   switching to the next service in the predetermined sequence and decoding third content provided by the next service in response to the received command, wherein
   the predetermined sequence is generated by grouping each of the plurality of different services in the table according to codec mode information associated with the respective service, and
   the third content is encoded in the one of the plurality of formats.

6. The method of claim 5, further comprising:
   identifying a channel surfing pattern; and
   generating the predetermined sequence based on the codec mode information for each of the plurality of different services and the identified channel surfing pattern.

7. The method of claim 1, wherein
   the first service is modulated based on a first modulation type and a second service of the plurality of difference services is modulated based on a second modulation type, and
   the table includes first modulation type information indicating the first modulation type associated with the first service and second modulation type information indicating the second modulation type associated with the second service.

8. The method of claim 7, wherein
   the first modulation type is 8-level vestigial sideband modulation, and
   the second modulation type is orthogonal frequency-division multiplexing.

9. A reception apparatus, comprising:
   a receiver configured to receive a first service, the first service providing first content and first metadata associated with the first content, the first content being encoded in one of a plurality of formats decodable by the reception apparatus;
   circuitry configured to
   generate first codec mode information based on the first metadata received with the first content, the first codec mode information indicating the one of the plurality of formats or a codec for decoding the one of the plurality of formats;
   store the generated first codec mode information in association with the first service in a table, wherein the circuitry is configured to store codec mode information for a plurality of different services, which includes the first service, in the table; and
   load a codec for decoding the first content provided by the first service based on the first codec information, retrieved from the table, for the first service when the first service is subsequently selected for display to a user.

10. The reception apparatus of claim 9, wherein the table includes channel numbers corresponding to each of the plurality of different services.

11. The reception apparatus of claim 10, wherein the circuitry is configured to
    receive a selection of a second service of the plurality of different services from a user;
    retrieve second codec mode information associated with the second service from the table in response to the received selection; and
    decode second content provided by the second service based on the retrieved second codec mode information.

12. The reception apparatus of claim 1, wherein the circuitry is configured to
    extract second metadata received with the second content; and
    determine whether the retrieved second codec mode information is valid based on the extracted second metadata.

13. The reception apparatus of claim 9, wherein the circuitry is configured to
receive a command to switch to a next service in a predetermined sequence of the plurality of different services while the first service is being received; and
switch to the next service in the predetermined sequence and decode third content provided by the next service in response to the received command, wherein
the predetermined sequence is generated by grouping each of the plurality of different services in the table according to codec mode information associated with the respective service, and
the third content is encoded in the one of the plurality of formats.

14. The reception apparatus of claim 13, wherein the circuitry is configured to
identify a channel surfing pattern; and
generate the predetermined sequence based on the codec mode information for each of the plurality of different services and the identified channel surfing pattern.

15. The reception apparatus of claim 9, wherein
the first service is modulated based on a first modulation type and a second service of the plurality of difference services is modulated based on a second modulation type, and
the table includes first modulation type information indicating the first modulation type associated with the first service and second modulation type information indicating the second modulation type associated with the second service.

16. The method of claim 15, wherein
the first modulation type is 8-level vestigial sideband modulation, and
the second modulation type is orthogonal frequency-division multiplexing.

17. A non-transitory computer readable medium storing computer-readable instructions therein which when executed by a computer cause the computer to perform a method for receiving content, the method comprising:
receiving a first service, the first service providing first content and first metadata associated with the first content, the first content being encoded in one of a plurality of formats decodable by the computer;
generating first codec mode information based on the first metadata received with the first content, the first codec mode information indicating the one of the plurality of formats or a codec for decoding the one of the plurality of formats;
storing the generated first codec mode information in association with the first service in a table, wherein the table includes codec mode information for a plurality of different services, which includes the first service; and
loading a codec for decoding the first content provided by the first service based on the first codec information, retrieved from the table, for the first service when the first service is subsequently selected for display to a user.

18. The non-transitory computer-readable medium of claim 17, wherein the table includes channel numbers corresponding to each of the plurality of different services.

19. The non-transitory computer-readable medium of claim 18, further comprising:
receiving a selection of a second service of the plurality of different services from a user;
retrieving second codec mode information associated with the second service from the table in response to the received selection; and
decoding second content provided by the second service based on the retrieved second codec mode information.

20. The non-transitory computer-readable medium of claim 19, further comprising:
extracting second metadata received with the second content; and
determining whether the retrieved second codec mode information is valid based on the extracted second metadata.

21. The non-transitory computer-readable medium of claim 17, further comprising:
receiving a command to switch to a next service in a predetermined sequence of the plurality of different services while the first service is being received; and
switching to the next service in the predetermined sequence and decoding third content provided by the next service in response to the received command, wherein
the predetermined sequence is generated by grouping each of the plurality of different services in the table according to codec mode information associated with the respective service, and
the third content is encoded in the one of the plurality of formats.

22. The method of claim 21, further comprising:
identifying a channel surfing pattern; and
generating the predetermined sequence based on the codec mode information for each of the plurality of different services and the identified channel surfing pattern.

23. The method of claim 17, wherein
the first service is modulated based on a first modulation type and a second service of the plurality of difference services is modulated based on a second modulation type, and
the table includes first modulation type information indicating the first modulation type associated with the first service and second modulation type information indicating the second modulation type associated with the second service.

24. The method of claim 23, wherein
the first modulation type is 8-level vestigial sideband modulation, and
the second modulation type is orthogonal frequency-division multiplexing.

* * * * *